United States Patent
Lu

(10) Patent No.: US 7,512,865 B2
(45) Date of Patent: Mar. 31, 2009

(54) METHOD FOR CONTROLLING READ VELOCITY IN A DISK DEVICE

(75) Inventor: Chao-Pei Lu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 616 days.

(21) Appl. No.: 11/278,149

(22) Filed: Mar. 31, 2006

(65) Prior Publication Data
US 2006/0233056 A1    Oct. 19, 2006

(30) Foreign Application Priority Data
Apr. 18, 2005   (TW) ............... 94112353 A

(51) Int. Cl.
*G11C 29/00* (2006.01)

(52) U.S. Cl. ............ 714/769; 360/73.07; 360/46; 360/73.03; 360/74.1; 369/47.15

(58) Field of Classification Search ............. 714/763, 714/769, 770, 771, 773; 369/47.15; 360/46, 360/73.08, 73.07, 73.03, 74.1
See application file for complete search history.

(56) References Cited

U.S. PATENT DOCUMENTS

| 5,303,095 | A  | * | 4/1994 | Vuong | .......... 360/46 |
| 7,394,736 | B2 | * | 7/2008 | Chang | .......... 369/47.36 |
| 2004/0165491 | A1 | * | 8/2004 | Wang | .......... 369/44.26 |

* cited by examiner

*Primary Examiner*—Guy J Lamarre
(74) *Attorney, Agent, or Firm*—Winston Hsu

(57) ABSTRACT

A method for controlling read velocity in a disk device is provided. When reading data on the disc, the method first reads each SYNC of blocks to form an ECC code, read data to decode, and checks and corrects decoded data to generate decoded errors. The type of decoded errors are classified and counted to form reference parameters of a rule base. A fuzzy engine checks if the counting number exceeds the threshold of the parameter, and executes the operation of the rule to control read velocity and enhance the data transfer rate in the disk device.

18 Claims, 3 Drawing Sheets

METHOD FOR CONTROLLING READ VELOCITY IN A DISK DEVICE

BACKGROUND OF THE INVENTION

1. Field of the Invention

The present invention relates to a method for controlling read velocity in a disk device, and more particularly to a controlling method which adjusts read velocity to steady the data transfer rate by defect detection while the disk device read data from a disc.

2. Description of the Prior Art

Since data marks of a disc are very high density, improper manufacture, usage, and storage usually cause defects, scratches, and dust on the disc to disable data marks from being decoded in a disk device. The disk device needs to lower read velocity and correct errors many times to read data so that the data transfer rate drops to affect the read velocity and efficiency.

A prior art disc records data with mark type. For example, a known DVD (Digital versatile Disk) forms a vortex-shaped track to record data. The track is divided into 16 blocks. The structure of each block is shown in FIG. 1. Original data which want to be stored are separated into several store units. Each store unit of 2048 bytes saves in one block, and constructs the primary data of the block. In the beginning of the block, there is a header of 12 bytes in the front of the primary data. The header includes 4 bytes ID (Identification Data), 2 bytes IED (ID Error Detection Code), and 6 bytes CPM (Copyright Management Information) in order. Besides, there is 4 byte EDC (Error Detection Code) after the primary data to check the error of the header. The header, the primary data and EDC construct a 2064 byte store unit which is divided 12 sectors. Each sector has 172 bytes and is modulated by codes to record on the DVD.

In order to assure the read reliability, a 13th sector of PO (Outer Code Parity) is added after the store unit, and 10 bytes PI (Inner Code Parity) is attached after each sector. Those PO and PI are formed based on the rule of encode modulation. The header, the primary data, EDC, PO, and PI construct a block. Therefore, the block records those PO and PI codes with SYNC (Synchronization Signal) type at the same time when the primary data is recorder on the DVD. When reading data on the DVD, each store unit, PO code and PI code of 16 blocks will be read to form an ECC code (Error Check and Correction) with 182 bytes×208 sector for checking and correcting the error of data when decoding.

The prior art method for adjusting read velocity is shown in FIG. 3. When reading data on a disk, the disk device first reads each SYNC of blocks to form an ECC code, and read data to decode. Each PO and PI code checking decoded data to find error positions caused by defects, scratches and dust of the disc. An outer correction circuit (not shown) will correct and count the errors. When the counting number is bigger than a predetermined value, i.e. decoded errors are too many, the disk device lowers read velocity to precisely read data and to have enough time to handle the operation of correction errors and. On the contrary, if the counting number doesn't exceed the predetermined value, the disk device reads data with a high read velocity.

However, decoded errors generated by the disk device don't completely relate to read velocity. The prior art method for adjusting read velocity just counts all decoded errors generated by PO and PI codes without analyzing the causes of errors. So the prior art method is not able to produce the correct relation with read situation, and can't provide proper disposal against errors. Consequently, the data transfer rate of the disk device drops to affect the read efficiency. Therefore, the prior art disk device still has some problems about correction operation of ECC to resolve.

SUMMARY OF THE INVENTION

One object of the invention is to provide a method for controlling read velocity in a disk device, which provides the correct disposal to steady read velocity by analyzing decoded errors to construct a rule base relating to the read situation of disk device.

Another object of the invention is to provide a method for controlling read velocity in a disk device, which increases the data transfer rate of a disk device by use of a fuzzy engine with artificial intelligence to control read velocity.

Further object of the invention is to provide a method for controlling read velocity in a disk device, which promotes the control performance of the fuzzy engine to meet the future expansion by use of the rule base having the flexibility of continuous improvement.

For achieving the above objects, the present invention provides a method for controlling read velocity in a disk device. When reading data on the disc, the method first reads each SYNC of blocks to form an ECC code, read data to decode, and checks and corrects decoded data to generate decoded errors. The type of decoded errors are classified and counted to form reference parameters of a rule base. A fuzzy engine checks if the counting number exceeds the threshold of the parameter, and executes the operation of the rule to control read velocity and enhance the data transfer rate in the disk device.

Further features and advantages of the invention, as well as the structure and operation of various embodiments of the invention, are described in detail below with reference to the accompanying drawings.

DETAILED DESCRIPTION

The present invention is a method for controlling read velocity in a disk device, which uses a fuzzy control theory to analyze the cause of error interrupt during decoding. The error interrupts are caused by defects, scratches and dust of a disc when the disk device read data from the disc. Error interrupts can be classified into various types. For example, according to the position where error interrupts occur during decoding, there are types of error interrupts as follows: ISYE (Illegal SYNC Error), SNE (Sector Number Error), SIE (Sector Information Error), CPRE (Copyright Error), EDCE (Error Detection Code Error), HE (Header Error), PIE (PI Error) and POE (PO Error). According to the type of error interrupts, the method counts the error times due to decoded errors, and properly determines the reference threshold of error times based on the speed of the correction operation and the importance of correct data for each type of error interrupts so as to form a rule base.

The structure of the rule base is as follows:

| The counter of the type of the error interrupts | Threshold |
|---|---|
| ISYE-Cnt | A |
| SNE-Cnt | E |
| SIE-Cnt | B |
| CPRE-Cnt | C |
| EDCE-Cnt | F |
| HE-Cnt | D |
| PIE-Cnt | G |
| POE-Cnt | H |

The rule for execution is as follows:

| | Condition | | | Disposal |
|---|---|---|---|---|
| Situation 1. | ISYE-Cnt | > A | | |
| | and SIE-Cnt | > B | => | lower read velocity. |
| | or CPRE-Cnt | > C | | |
| Situation 2. | HE-Cnt | > D | | |
| | and SNE-Cnt | > E | => | lower read velocity. |
| Situation 3. | SIE-Cnt | > B | => | redecode. |
| Situation 4. | EDCE-Cnt | > F | | |
| | and PIE-Cnt | > G | => | increase read velocity. |
| | and POE-Cnt | > H | | |

When being in situation 1, the disk device executes the disposal of the above-mentioned rule to lower read velocity to precisely correct the error because ISYE, SIE and CPRE are errors of main formats which will cause elementary errors or the loss of copyright management. When being in situation 2, the disk device also executes the disposal of the above-mentioned rule to lower read velocity to precisely correct the error because errors of HE and SNE may cause the risk of reading data wrong. When being in situation 3, the disk device executes the disposal of the above-mentioned rule to redecode because errors of SIE are amendable part. When being in situation 4, the disk device increase read velocity to quickly pass the error region to prevent more error interrupts from generating because errors of EDCE, PI and POE are not main data. Therefore, by analyzing decoded errors, a rule base relating to read situation can be constructed to provide the disk device with correct disposals.

Figure 1:
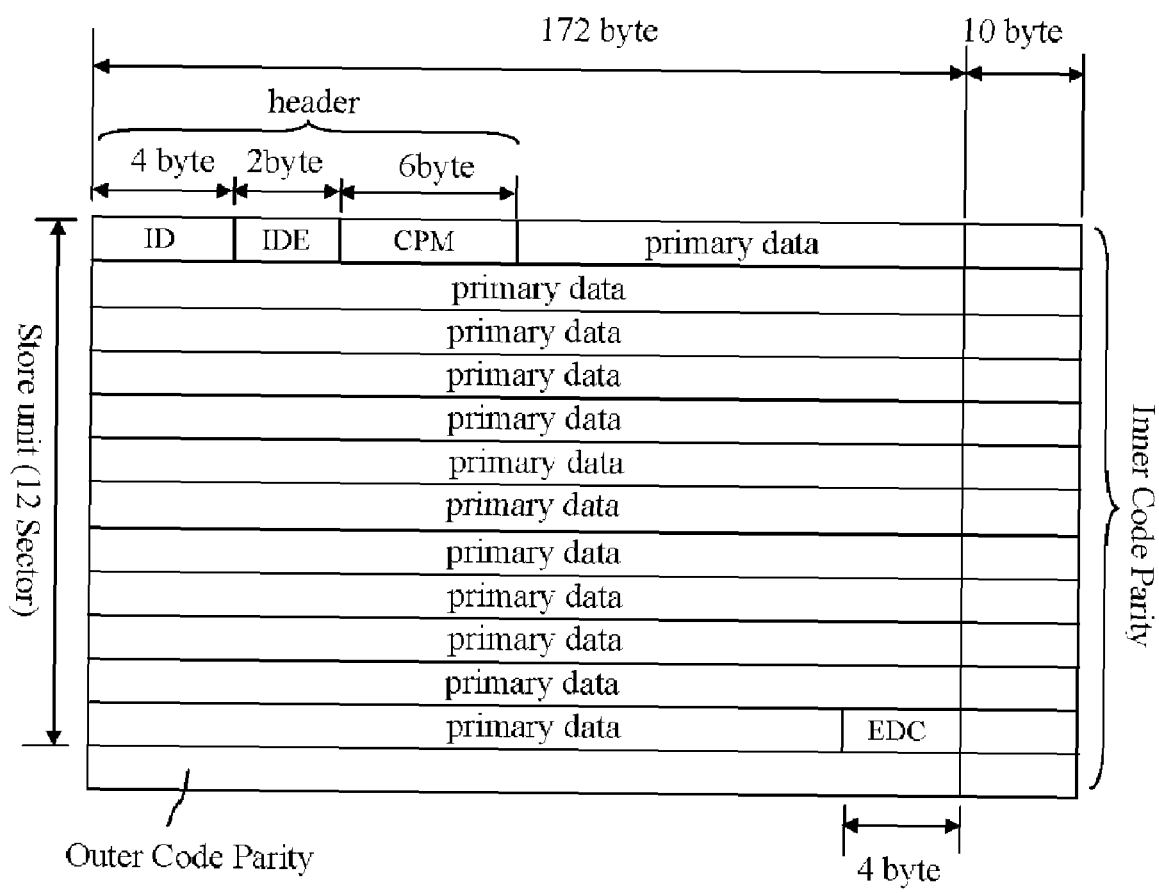
FIG. 1 is the data structure of the block of a prior art DVD.
Figure 2:
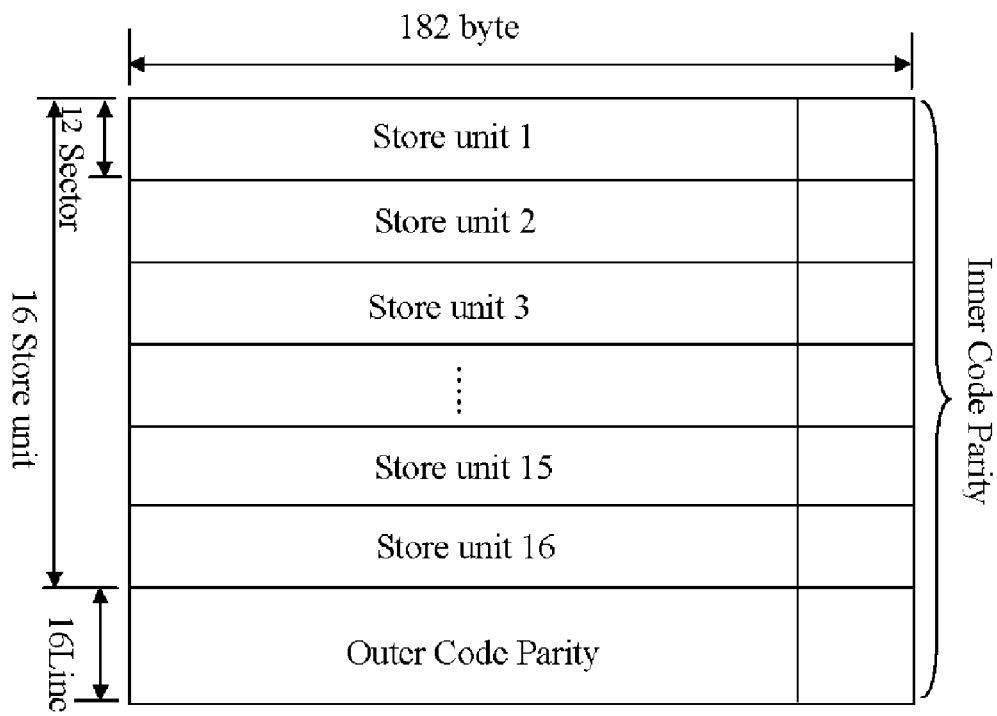
FIG. 2 is the ECC structure of a prior art DVD.
Figure 3:
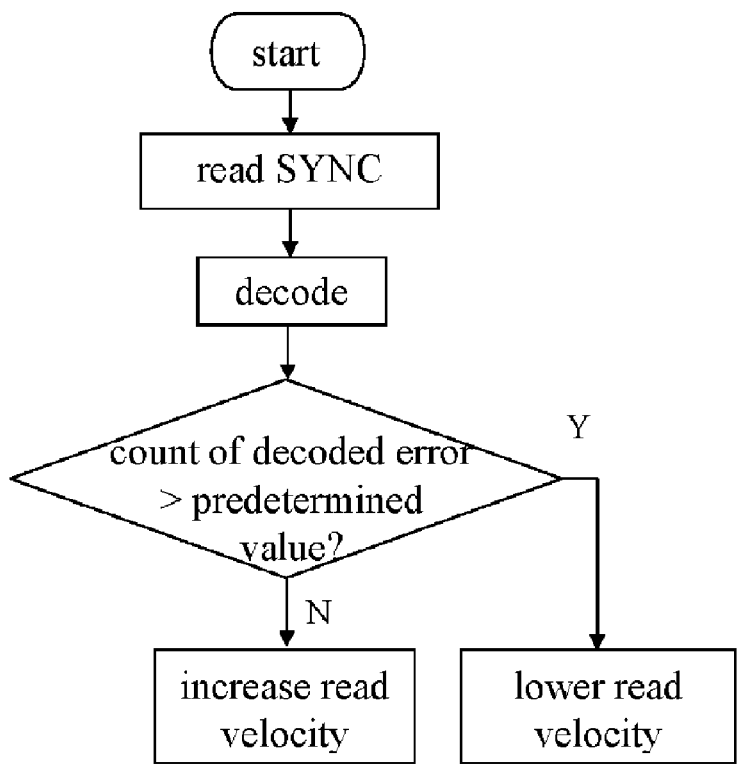
FIG. 3 is the flow chart of controlling read velocity in a prior art disk device.
Figure 4:
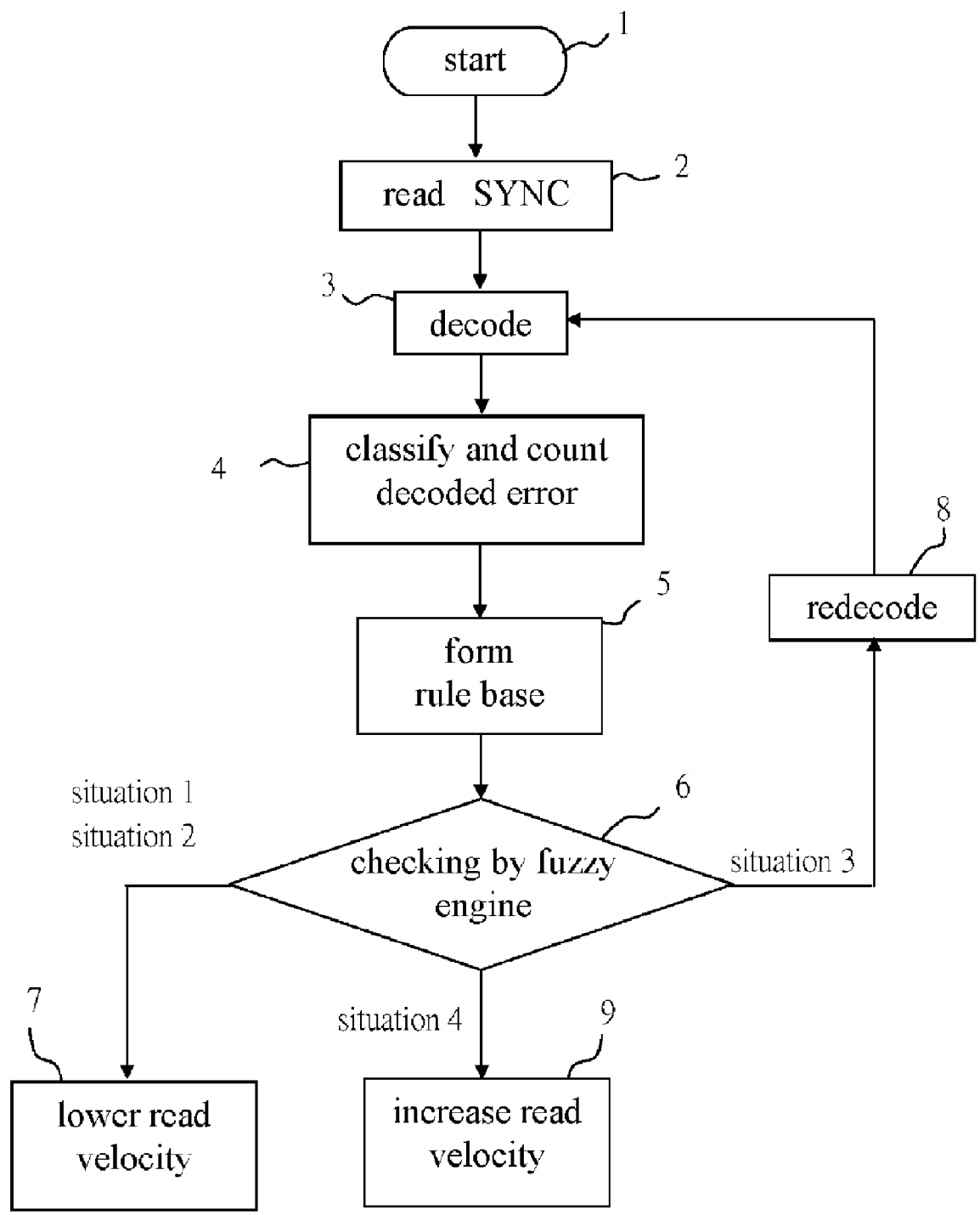
FIG. 4 is the flow chart of controlling read velocity of the present invention in a disk drive.

According to the above-mentioned structure of the rule base, the method of the present invention could use a fuzzy engine to determine the correct disposal for the disk device. Steps of the method for controlling read velocity in the present invention are shown in FIG. 4. At step 1, the disk device starts to read data on the disc. The disk device first reads each SYNC of every block to form ECC code at step 2. Then, at step 3, the disk device reads data to decode, and each PO and PI code check and correct the decoded data to find out the position of decoded errors caused by defects, scratches and dust of the disc. When entering step 4, the disk device classifies the type decoded errors based on the position where decoded errors occur, and counts times of decoded errors for each type of decoded errors. At step 5, the rule base updates parameters according to the counting times. According to predetermined execution rules, the fuzzy engine controls the disk device to correctly dispose by comparing the parameters with thresholds of decoded errors and checking if conditions of any situation of the rule base meet. For example, the disk device goes to step 7 to lower read velocity if conditions meet the above-mentioned situation 1 or situation 2, to step 8 to redecode if conditions meet the above-mentioned situation 3, and to step 9 to increase read velocity if conditions meet the above-mentioned situation 4. Thus, the read velocity of the disk device can properly be controlled to steady the data transfer rate.

The method of the present invention properly sets above-mentioned thresholds of A, B, C, D, E, F, G and H by test, such as

| Situation 1. | ISYE-Cnt | > 3 | | |
|---|---|---|---|---|
| | and SIE-Cnt | > 2 | => | lower read velocity. |
| | or CPRE-Cnt | > 0 | | |
| Situation 2. | HE-Cnt | > 5 | | |
| | and SNE-Cnt | > 5 | => | lower read velocity. |
| Situation 3. | SIE-Cnt | > 2 | => | redecode. |
| Situation 4. | EDCE-Cnt | > 2 | | |
| | and PIE-Cnt | > 3 | => | increase read velocity. |
| | and POE-Cnt | > 3 | | |

Following the above rule, the method of the present invention can control read velocity of the disk device to achieve higher data transfer rate and to short response of lowering ready velocity. Therefore, by analyzing decoded errors, the method of the present invention constructs the rule base to relate control means to read situations, and uses a fuzzy engine to check and determine correct read velocity for the control of the disk device. According to real read situation, the disk device efficiently controls and steadies read velocity to arise data transfer rate of the disk device. Besides, with the amendment, update, and complexity of disk device, the rule base of the present invention is able to add and delete rules and parameters of error interrupts. The rule base not only has the expansion flexibility, but also enables the fuzzy engine to have the control of artificial intelligence to meet future demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling read velocity in a disk device, comprising the steps of:
    forming an ECC code;
    reading data to decode;
    correcting decoded data with the ECC code;
    classifying and counting decoded errors;
    using a fuzzy engine to check if each count exceed a specific threshold and if conditions of execution rules are met; and
    executing the execution rule where the conditions are met.

2. The method of claim 1, wherein the ECC code corrects decoded data to generate decoded errors if the decoded data are wrong.

3. The method of claim 2, wherein the decoded errors is classified into various types according to the position of the decoded errors.

4. The method of claim 3, wherein the types of decoded errors are Illegal SYNC Error, Sector Number Error, Sector Information Error, Copyright Error, Error Detection Code Error, Header Error, PI Error and PO Error.

5. The method of claim 3, wherein the types of decoded errors save in a rule base.

6. The method of claim 5, wherein the rule base has the expansion flexibility to add and delete the types of decoded errors, execution rules and thresholds.

7. The method of claim 5, wherein the thresholds are predetermined parameters and save in the rule base.

8. The method of claim 7, wherein the value of the thresholds is set based on the speed of the correction operation and the importance of data.

9. The method of claim 7, wherein each decoded error has a specific threshold according to the type of the decoded errors.

10. The method of claim 1, wherein the execution rules are save in a rule base.

11. The method of claim 1, wherein the execution rule includes conditions and disposals of controlling the disk device.

12. The method of claim 11, wherein the disposals include lowering read velocity, increasing read velocity and redecoding.

13. The method of claim 11, wherein the conditions include at least one count of the type of the decoded error which exceeds the threshold.

14. The method of claim 1, wherein the step of executing the execution rule is to lower read velocity if each count of decoded errors of illegal SYNC error, sector information error, and copyright error exceed its threshold.

15. The method of claim 1, wherein the step of executing the execution rule is to lower read velocity if each count of decoded errors of header error and sector number error exceed its threshold.

16. The method of claim 1, wherein the step of executing the execution rule is to recode read data if only the count of sector Information Error exceeds its threshold.

17. The method of claim 1, wherein the step of executing the execution rule is to increase read velocity if each count of decoded errors of error detection code error, PI error and PO error exceed its threshold.

18. The method of claim 1, wherein the ECC code is formed by Synchronization Signal.

* * * * *